United States Patent
Wang et al.

(10) Patent No.: US 12,081,662 B2
(45) Date of Patent: Sep. 3, 2024

(54) AUTOMATED KEY AND ENCRYPTION SYSTEM

(71) Applicant: eBay Inc., San Jose, CA (US)

(72) Inventors: Zhongping Wang, Shanghai (CN); Shamna Mattammel, San Jose, CA (US); Ashwin Ambekar, San Jose, CA (US); Weiji Shi, San Jose, CA (US); Sriram Govindasamy, San Jose, CA (US)

(73) Assignee: eBay Inc., San Jose, CA (US)

( * ) Notice: Subject to any disclaimer, the term of this patent is extended or adjusted under 35 U.S.C. 154(b) by 28 days.

(21) Appl. No.: 16/065,415

(22) PCT Filed: Jun. 5, 2018

(86) PCT No.: PCT/CN2018/089928
§ 371 (c)(1),
(2) Date: Jun. 22, 2018

(87) PCT Pub. No.: WO2019/232692
PCT Pub. Date: Dec. 12, 2019

(65) Prior Publication Data
US 2021/0211283 A1    Jul. 8, 2021

(51) Int. Cl.
*H04L 9/08* (2006.01)

(52) U.S. Cl.
CPC .......... *H04L 9/0891* (2013.01); *H04L 9/0819* (2013.01)

(58) Field of Classification Search
CPC ....... H04L 9/0891; H04L 9/0819; H04L 9/08; H04L 9/088; H04L 9/0816; H04L 9/0894
See application file for complete search history.

(56) References Cited

U.S. PATENT DOCUMENTS 6,907,127 B1   6/2005   Kravitz et al.
8,422,686 B2   4/2013   Cachin et al.
(Continued)

FOREIGN PATENT DOCUMENTS

CN   1777094 A    5/2006
WO   2009/002396 A1   12/2008
(Continued)

OTHER PUBLICATIONS

Godaddy Help In, "Renewing My SSL Certificate", Retrieved from the Internet URL: https: in.godaddy.com help renewing-my-ssl-certificate-864, (Accessed on Apr. 9, 2018), 4 pages.
(Continued)

*Primary Examiner* — Oleg Korsak
(74) *Attorney, Agent, or Firm* — Shook, Hardy & Bacon L.L.P.

(57) ABSTRACT

An automated encryption system to: store a first key policy in association with a first key, and a second key policy in association with a second key; determine that a remote machine stores a first application that is affected by the first key policy and a second application affected by the second key policy, wherein the first application utilizes the first key to encrypt first data, and the second application utilizes the second key to encrypt second data; determine that the first key of the first application is non-compliant with the first key policy; send a request to deploy a third key in response to determining that the first key of the first application is non-compliant with the first key policy; and receive a response that includes a result of the request to deploy the third key.

20 Claims, 11 Drawing Sheets

(56) References Cited

U.S. PATENT DOCUMENTS

| | | | |
|---|---|---|---|
| 8,503,680 B1* | 8/2013 | Clifford | H04L 9/088 713/193 |
| 8,561,127 B1* | 10/2013 | Agrawal | H04L 63/105 726/13 |
| 8,948,381 B2* | 2/2015 | Song | H04L 9/088 380/278 |
| 9,002,018 B2 | 4/2015 | Wilkins et al. | |
| 9,124,430 B2* | 9/2015 | Harjula | H04L 63/062 |
| 9,547,771 B2* | 1/2017 | Roth | H04L 9/088 |
| 9,552,485 B1 | 1/2017 | Cignetti et al. | |
| 9,843,446 B2 | 12/2017 | Mityagin | |
| 9,870,289 B2 | 1/2018 | Yallamraju et al. | |
| 9,967,289 B2* | 5/2018 | White | G06F 21/602 |
| 10,367,814 B2* | 7/2019 | Walker | H04W 12/37 |
| 10,511,630 B1* | 12/2019 | Weiss | H04L 63/20 |
| 10,691,822 B1* | 6/2020 | Brandwine | G06F 21/604 |
| 10,931,673 B2* | 2/2021 | Chud | G06F 21/30 |
| 2004/0001594 A1 | 1/2004 | Krishnaswamy et al. | |
| 2004/0193872 A1 | 9/2004 | Saarepera | |
| 2005/0232427 A1 | 10/2005 | Konersmann | |
| 2005/0238174 A1* | 10/2005 | Kreitzer | H04L 9/088 380/277 |
| 2007/0074047 A1 | 3/2007 | Metzger et al. | |
| 2008/0091955 A1* | 4/2008 | Leach | H04L 9/06 713/193 |
| 2008/0319909 A1* | 12/2008 | Perkins | H04L 63/068 705/50 |
| 2009/0092252 A1 | 4/2009 | Noll et al. | |
| 2010/0208898 A1* | 8/2010 | Acar | H04L 9/0891 380/280 |
| 2011/0164752 A1* | 7/2011 | Wainner | H04L 63/104 709/224 |
| 2011/0293096 A1* | 12/2011 | Reilly | H04L 9/0894 380/277 |
| 2012/0204032 A1* | 8/2012 | Wilkins | H04L 63/0428 713/170 |
| 2012/0246463 A1* | 9/2012 | Shea | H04L 63/0428 713/153 |
| 2013/0046988 A1* | 2/2013 | Saldhana | G06F 21/10 713/168 |
| 2013/0064365 A1* | 3/2013 | Song | H04L 9/088 380/44 |
| 2013/0227280 A1* | 8/2013 | Quinlan | H04L 9/08 713/165 |
| 2013/0339252 A1* | 12/2013 | Pauker | H04L 9/0625 705/64 |
| 2014/0181517 A1* | 6/2014 | Alaranta | G06F 21/51 713/168 |
| 2014/0230007 A1* | 8/2014 | Roth | G06F 21/602 726/1 |
| 2014/0282849 A1* | 9/2014 | Collison | H04W 12/68 726/1 |
| 2015/0086018 A1* | 3/2015 | Harjula | H04L 9/0816 380/277 |
| 2015/0310221 A1* | 10/2015 | Lietz | H04L 9/16 713/193 |
| 2015/0373023 A1* | 12/2015 | Walker | H04L 63/10 726/3 |
| 2016/0099972 A1* | 4/2016 | Qureshi | G06F 21/53 726/1 |
| 2016/0105283 A1* | 4/2016 | Mityagin | H04L 63/068 380/279 |
| 2016/0170669 A1* | 6/2016 | Yallamraju | G06F 11/1464 711/162 |
| 2016/0269179 A1* | 9/2016 | White | H04L 9/0897 |
| 2016/0269364 A1* | 9/2016 | White | H04L 63/061 |
| 2016/0350561 A1* | 12/2016 | Poiesz | G06F 21/74 |
| 2017/0004312 A1* | 1/2017 | Agarwal | H04W 12/02 |
| 2017/0006064 A1* | 1/2017 | Agarwal | H04L 9/3263 |
| 2017/0085540 A1 | 3/2017 | Avanzi et al. | |
| 2017/0111171 A1* | 4/2017 | Sampathkumar | H04L 9/0891 |
| 2017/0250811 A1* | 8/2017 | Edwards | H04L 9/0894 |
| 2017/0250964 A1* | 8/2017 | Edwards | H04L 63/06 |
| 2017/0250966 A1* | 8/2017 | White | G06F 12/128 |
| 2018/0007048 A1* | 1/2018 | Weaver | H04L 63/0815 |
| 2018/0063103 A1* | 3/2018 | Jahid | H04L 63/061 |
| 2018/0063193 A1* | 3/2018 | Chandrashekhar | H04L 63/029 |
| 2019/0089705 A1* | 3/2019 | Chud | H04L 63/102 |
| 2019/0207759 A1* | 7/2019 | Chan | H04L 9/0861 |

FOREIGN PATENT DOCUMENTS

| | | | | |
|---|---|---|---|---|
| WO | 2012/161417 A1 | 11/2012 | | |
| WO | WO-2019232692 A1 * | 12/2019 | | H04L 63/0428 |

OTHER PUBLICATIONS

Information Security, "One Website—Two Different SSL Certificates: Two Different CA's", Retrieved from the Internet URL: https:security.stackexchange.com questions 100172 one-website-two-different-ssl-certificates-two-different-cas 100177, (Sep. 13, 2015), 2 pages.

The Windows Club, "How to View and Check Security Certificates in Chrome Browser", Retrieved from the Internet URL: https:www.thewindowsclub.com how-to-check-security-certificates-in-chrome-browser, (Feb. 7, 2017), 7 pages.

International Written Opinion for PCT Application No. PCT/CN2018/089928, mailed on Feb. 27, 2019, 4 pages.

International Search Report for PCT Application No. PCT/CN2018/089928, mailed on Feb. 27, 2019, 5 pages.

International Preliminary Report on Patentability received for PCT Application No. PCT/CN2018/089928, mailed on Dec. 17, 2020, 5 Pages.

* cited by examiner

AUTOMATED KEY AND ENCRYPTION SYSTEM

CLAIM OF PRIORITY

This Application is a U.S. National Stage Filing under 35 U.S.C. 371 of International Application No. PCT/CN2018/089928, filed on 5 Jun. 2018, which is hereby incorporated by reference in its entirety.

TECHNICAL FIELD

The subject matter of the present disclosure generally relates methods and systems supporting data encryption and key management.

BACKGROUND

In cryptography, a key is a piece of information (a parameter) that determines the functional output of a cryptographic algorithm. For encryption algorithms, a key can specify for example the transformation of plaintext into ciphertext, and vice versa for decryption algorithms. Keys may also specify transformations in other cryptographic algorithms, such as digital signature schemes and message authentication codes.

Cryptographic systems may use different types of keys, with some systems using more than one. These may include symmetric keys or asymmetric keys. In a symmetric key algorithm, the keys involved are identical for both encrypting and decrypting a message. Keys must be chosen carefully, and distributed and stored securely. Asymmetric keys, also known as public keys, in contrast are two distinct keys that are mathematically linked. They are typically used together to communicate. Public key infrastructure (PK1) is the term most often used to describe the implementation of public key cryptography. PKI requires an organization to establish an infrastructure to create and manage public and private key pairs along with digital certificates.

In designing security systems, it is often common to assume that the details of the cryptographic algorithm are available to an attacker. A key is therefore often easier to protect than an encryption algorithm, and easier to change if compromised. Thus, in conventional systems, the security of an encryption system relies in some part on attributes of keys and the keys themselves, being kept secret.

BRIEF DESCRIPTION OF THE DRAWINGS

Various ones of the appended drawings merely illustrate example embodiments of the present disclosure and are not intended to limit its scope to the illustrated embodiments. On the contrary, these examples are intended to cover alternatives, modifications, and equivalents as may be included within the scope of the disclosure.

DETAILED DESCRIPTION

Figure 1:
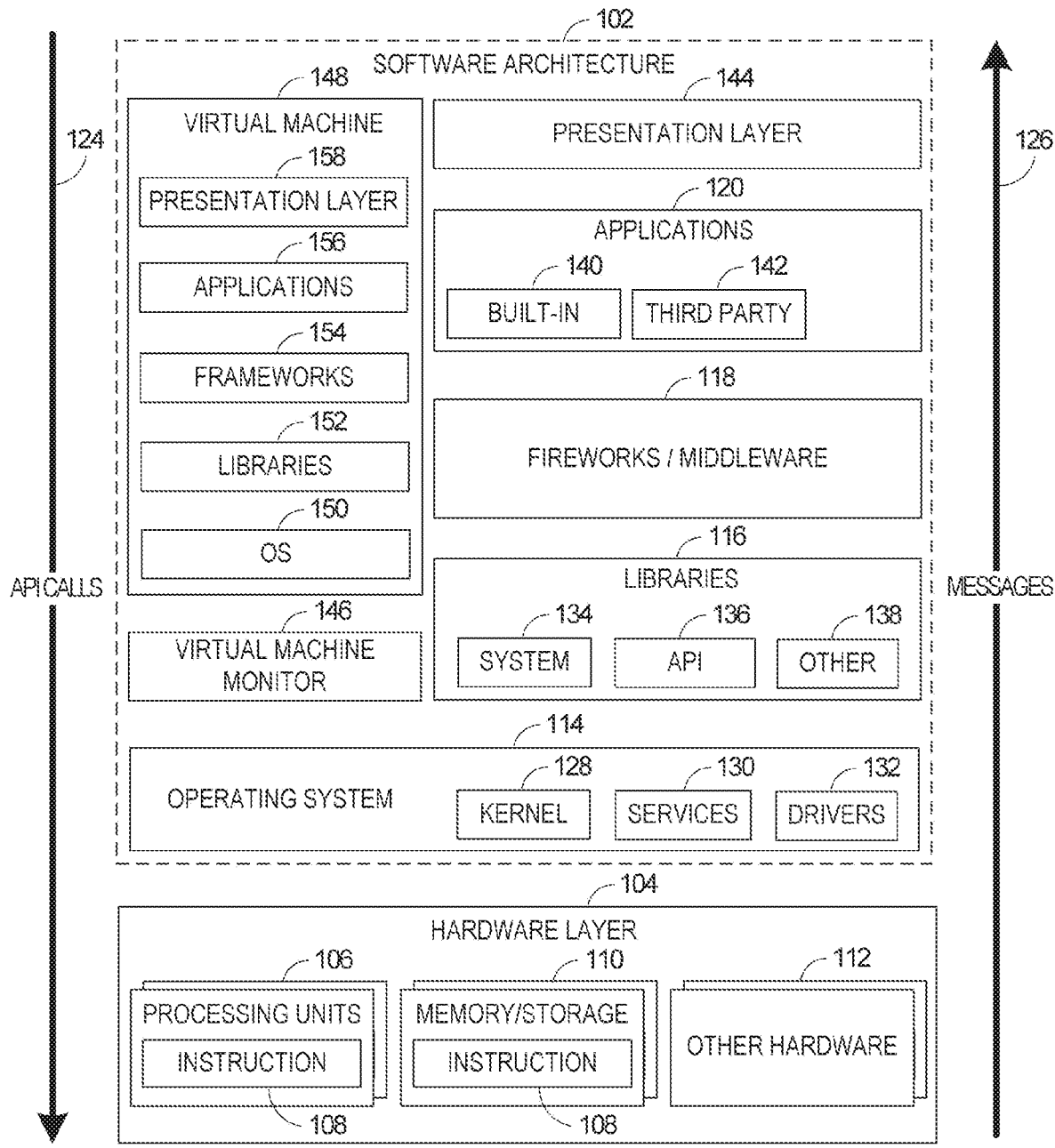
FIG. 1 is a block diagram illustrating an example of a software architecture that may be installed on a machine, according to some example embodiments.

Key management refers to management of cryptographic keys in a cryptosystem. This includes dealing with the generation, exchange, storage, use, crypto-shredding (destruction) and replacement of keys. A cryptographic key is a string of data that is used to lock or unlock cryptographic functions, including authentication, authorization and encryption. Cryptographic keys are grouped into cryptographic key types/policies according to the functions they perform and attributes of the keys themselves.

Cryptographic key policies include, private key signature key; public signature verification key; symmetric authentication key; private authentication key; public authentication key; symmetric data encryption key; symmetric key wrapping key; symmetric and asymmetric random number generation keys; symmetric master key; private key transport key; public key transport key; symmetric key agreement key; private static key agreement key; public static key agreement key; private ephemeral key agreement key; public ephemeral key agreement key; symmetric authorization key, private authorization key; and public authorization key.

Successful key management is critical to the security of a cryptosystem. It is the more challenging side of cryptography in a sense that conventional systems may additionally involve aspects of social engineering such as system policy, user training, organizational and departmental interactions, and coordination between all of these elements, in contrast to pure mathematical practices that may be automated.

There is a challenge in ensuring all data within a cryptosystem is utilizing the most up to date encryption standard. In conventional systems, revisions or changes made to encryption standards in the cryptosystem may lead to security gaps and non-compliant data. This is especially a problem when a large network of machines may be maintained, and a machine may use one or more encryption techniques. Keeping track of the keys and certificates of machines is especially problematic. Even further, keeping track of individual applications using different certificates on a machine, if each application uses a different certificate or key. A system to automatically manage and update keys within the cryptosystem, such that machines may receive updated certificates or keys, and send back notifications to a central system on their status, would therefore be an improvement to existing technology, and may offer enhanced security beyond conventional encryption systems because, for example, it ensures that many machines across the network are kept up to date with security standards. Still further, the system described herein includes efficient and automated mechanisms for update of keys and certificates, offering to improve efficiency and operation of maintenance of the network. Even further, a technical advantage may include a saving in bandwidth because the system described may deploy multiple changes based on a single change in a key attribute—multiple changes to policy can be consolidated into a single set of message calls instead of a chain of message calls.

An automated key and encryption system provides functionality to enable an administrator of an encryption system to quickly and efficiently update expired or out of date cryptographic keys within the system, providing an added layer of security. This may include sending or deploying new certificates or keys, compliant with policies to remote machines. Key may for example be deployed through various protocols including, but not limited to, Secure Shell protocol (SSH), Pretty Good Privacy (PGP), Secure Copy Protocol (SCP), Internet Protocol Security (IPsec), as well as Hypertext Transfer Protocol (HTTP). This is particularly useful in large and expansive systems, where different encryption protocols may have been applied over an extended period of time. In such systems, key policies may be added or changed several times through the life of the encryption system. In order to ensure that all data remains secure, it is necessary to update old, out of date key policies, using the most up to date standards.

Reference will now be made in detail to specific example embodiments for carrying out the inventive subject matter of the present disclosure. In the following description, specific details are set forth in order to provide a thorough understanding of the subject matter. It shall be appreciated that embodiments may be practiced without some or all of these specific details.

Below are described various aspects of the automated key and encryption system that may be utilized for the encryption of data. According to certain example embodiments, aspects of the automated key and encryption system include various functional components to perform operations that include: storing a first key policy in association with a first key, and a second key policy in association with a second key, wherein the key policies define one or more rules and procedures to generate, exchange, store, and replace public and private cryptographic keys/key pairs and keys; determining that a remote machine stores a first application that is affected by the first key policy and a second application affected by the second key policy, wherein the first application utilizes the first key to encrypt first data, and the second application utilizes the second key to encrypt second data; determining that the first key of the first application is non-compliant with the first key policy; sending a request to deploy a third key in response to determining that the first key of the first application is non-compliant with the first key policy; and receiving a response that includes a result of the request to deploy the third key.

In some embodiments, an administrator of the automated key and encryption system may define one or more exceptions to the first and second key policies. The automated key and encryption system may determine that the second key of the second application is non-compliant with the second key policy. For example, the second key may be expired or out of date, or may contain one or more non-compliant attributes. Under typical procedure, the automated key and encryption system would update the non-compliant key with an updated key, however in response to identifying an exception (e.g., of the second key, or the second application), the automated key and encryption system suppresses a request to update the key.

In further embodiments, an administrator of the automated key and encryption system may roll out updates to key policies by providing an input that flags or otherwise defines one or more expired or out of date keys associated with applications, and providing a "new," up-to-date key. For example, in response to receiving an input that identifies one or more expired or outdated keys, the automated key and encryption system identifies applications or individual data objects that utilize the expired or out of date keys, and presents a notification to the administrator that includes an identification of the application, and an indication of the key utilized to encrypt data associated with the application.

In response to receiving the notification, the administrator provides a response to the notification, wherein the response includes a request to update the keys of all or a portion of the applications. In response the automated key and encryption system generates and deploys new, up-to-date keys to a selected group of applications.

In some example embodiments, the automated key and encryption system may provide one or more specially configured graphical user interfaces (GUI) for receiving inputs to define key attributes of key policies. The administrator provides inputs that define or change one or more attributes of a key associated with a key policy. The one or more attributes may include a key size, symmetry or asymmetry, as well as expiration events or parameters associated with the key.

In response to receiving the inputs that include the changes or updates to the key, the automated key and encryption system applies a modification to a key policy that corresponds with the key (e.g., the first key policy). In further embodiments, in response modifying the corresponding key policy, the automated key and encryption system identifies and flags one or more applications utilizing the first key policy (which may now be out of date), in order to roll out updates based on the modifications.

Consider an illustrative example from a user perspective. The automated key and encryption system manages a set of keys generated based on a first key policy, and utilized by an application to encrypt data objects. As a result of a trigger event occurring (e.g., a change in an encryption standard within a policy, an expiration of a key, or a breach in security), the automated key and encryption system automatically generates a new key that is compliant with the policy, deploys the new, compliant key to an affected application of a machine, and receives a notification back that the new key was deployed and is being used. In some embodiments, the administrator may additionally generate multiple key policies to generate keys and create a key policy queue, wherein as one key policy expires, a subsequent key policy may be rolled out to applications to utilize the subsequent key policy for the generation of keys.

FIG. 1 is a block diagram illustrating an example of a software architecture that may be installed on a machine, according to some example embodiments. FIG. 1 is merely a non-limiting example of a software architecture, and it will be appreciated that many other architectures may be implemented to facilitate the functionality described herein. The software architecture 102 may be executing on hardware such as a machine 1100 of FIG. 11 that includes, among other things, processors 1110, memory 1130, and I/O components 1150. A representative hardware layer 104 is illustrated and can represent, for example, the machine 1100 of FIG. 11. The representative hardware layer 104 comprises one or more processing units 106 having associated executable instructions 108. The executable instructions 108 represent the executable instructions of the software architecture 102, including implementation of the methods, modules, and so forth of FIGS. 2-6. The hardware layer 104 also includes memory or storage modules 110, which also have the executable instructions 108. The hardware layer 104 may also comprise other hardware 112, which represents any other hardware of the hardware layer 104, such as the other hardware illustrated as part of the machine 100.

In the example architecture of FIG. 1, the software architecture 102 may be conceptualized as a stack of layers, where each layer provides particular functionality. For example, the software architecture 102 may include layers such as an operating system 114, libraries 116, frameworks/middleware 118, applications 120, and a presentation layer 1044. Operationally, the applications 120 or other components within the layers may invoke API calls 124 through the software stack and receive a response, returned values, and so forth (illustrated as messages 126) in response to the API calls 124. The layers illustrated are representative in nature, and not all software architectures have all layers. For example, some mobile or special purpose operating systems may not provide a frameworks/middleware 118 layer, while others may provide such a layer. Other software architectures may include additional or different layers.

The operating system 114 may manage hardware resources and provide common services. The operating system 114 may include, for example, a kernel 128, services 130, and drivers 132. The kernel 128 may act as an abstraction layer between the hardware and the other software layers. For example, the kernel 128 may be responsible for memory management, processor management (e.g., scheduling), component management, networking, security settings, and so on. The services 130 may provide other common services for the other software layers. The drivers 132 may be responsible for controlling or interfacing with the underlying hardware. For instance, the drivers 132 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 116 may provide a common infrastructure that may be utilized by the applications 120 and/or other components and/or layers. The libraries 116 typically provide functionality that allows other software modules to perform tasks in an easier fashion than by interfacing directly with the underlying operating system 114 functionality (e.g., kernel 128, services 130, or drivers 132). The libraries 116 may include system 134 libraries (e.g., C standard library) that may provide functions such as memory allocation functions, string manipulation functions, mathematic functions, and the like. In addition, the libraries 116 may include API libraries 136 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 116 may also include a wide variety of other libraries 138 to provide many other APIs to the applications 120 and other software components/modules.

The frameworks 118 (also sometimes referred to as middleware) may provide a higher-level common infrastructure that may be utilized by the applications 120 or other software components/modules. For example, the frameworks 118 may provide various graphic user interface (GUI) functions, high-level resource management, high-level location services, and so forth. The frameworks 118 may provide a broad spectrum of other APIs that may be utilized by the applications 120 and/or other software components/modules, some of which may be specific to a particular operating system or platform.

The applications 120 include built-in applications 140 and/or third party applications 142. Examples of representative built-in applications 140 may include, but are not limited to, a contacts application, a browser application, a book reader application, a location application, a media application, a messaging application, or a game application. The third party applications 142 may include any of the built-in applications, as well as a broad assortment of other applications. In a specific example, the third party application 142 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 142 may invoke the API calls 124 provided by the mobile operating system such as the operating system 114 to facilitate functionality described herein.

The applications 120 may utilize built-in operating system functions (e.g., kernel 128, services 130, or drivers 132), libraries (e.g., system 134, APIs 136, and other libraries 138), or frameworks/middleware 118 to create user interfaces to interact with users of the system. Alternatively, or additionally, in some systems, interactions with a user may occur through a presentation layer, such as the presentation layer 144. In these systems, the application/module "logic" can be separated from the aspects of the application/module that interact with the user.

Some software architectures utilize virtual machines. In the example of FIG. 1, this is illustrated by a virtual machine 148. A virtual machine creates a software environment where applications/modules can execute as if they were executing on a hardware machine e.g., the machine 100 of FIG. 1, for example) A virtual machine is hosted by a host operating system (e.g., operating system 114) and typically, although not always, has a virtual machine monitor 146, which manages the operation of the virtual machine as well as the interface with the host operating system (e.g., operating system 114). A software architecture executes within the virtual machine 148, such as an operating system 150, libraries 152, frameworks/middleware 154, applications 156, or a presentation layer 158. These layers of software architecture executing within the virtual machine 148 can be the same as corresponding layers previously described or may be different.

Figure 2:
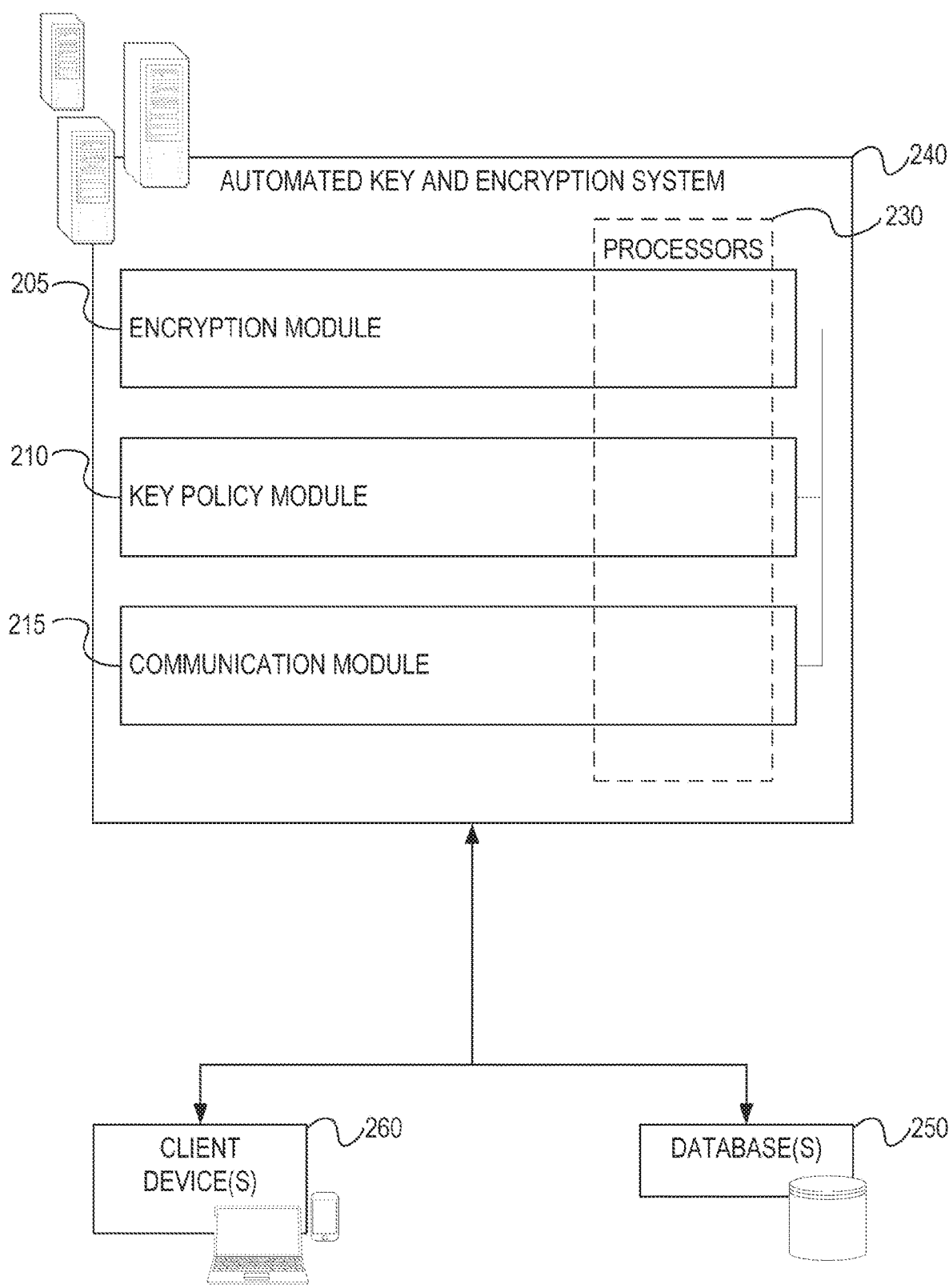
FIG. 2 is a block diagram illustrating various functional components of an encryption compliance system, which is provided as part of the networked system, according to example embodiments.

FIG. 2 is a block diagram illustrating components of an automated key and encryption system 240 that provide functionality to identify applications utilizing out of date keys, and to automatically update the out of date keys, according to certain example embodiments. The automated key and encryption system 240 is show as including an encryption module 205, a key policy module 210, and a communication module 215, all configured to communicate with each other (e.g., via a bus, shared memory, or a switch). Any one or more of these modules may be implemented using one or more processors 230 (e.g., by configuring such one or more processors to perform functions described for that module) and hence may include one or more of the processors 230.

Any one or more of the modules described may be implemented using dedicated hardware alone (e.g., one or more of the processors 230 of a machine) or a combination of hardware and software. For example, any module described of the automated key and encryption system 240 may physically include an arrangement of one or more of the processors 230 (e.g., a subset of or among the one or more processors of the machine) configured to perform the operations described herein for that module. As another example, any module of the automated key and encryption system 240 may include software, hardware, or both, that configure an arrangement of one or more processors 230 (e.g., among the one or more processors of the machine) to perform the operations described herein for that module. Accordingly, different modules of the automated key and encryption system 240 may include and configure different arrangements of such processors 230 or a single arrangement of such processors 230 at different points in time. Moreover, any two or more modules of the automated key and encryption system 240 may be combined into a single module, and the functions described herein for a single module may be subdivided among multiple modules. Furthermore, according to various example embodiments, modules described herein as being implemented within a single machine, database, or device may be distributed across multiple machines, databases, or devices.

In some example embodiments, the automated key and encryption system 240 may be in communication with database(s) 250, and client device(s) 260. For example, the automated key and encryption system 240 may communicate, provide access, or stream, data (e.g., data objects to be encrypted) to database(s) 250. Similarly, the automated key and encryption system 240 may receive data from the client device(s) 260 (e.g., data objects to be encrypted).

Figure 3:
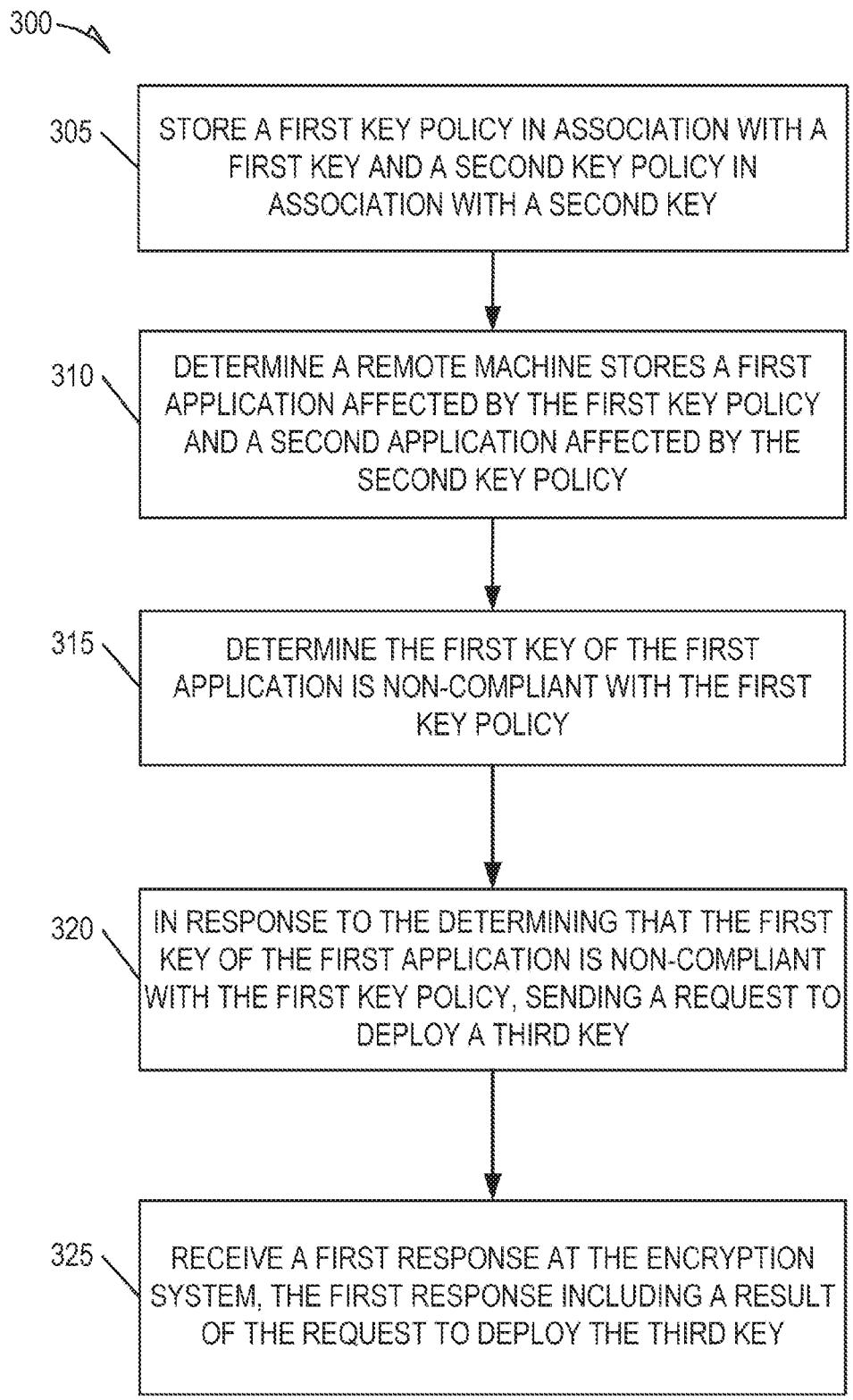
FIG. 3 is a flowchart illustrating a method for updating an out of date key at a remote machine, according to an example embodiment.

FIG. 3 is a flowchart illustrating a method 300 for updating an out of date key at a remote machine, according to an example embodiment. The method 300 may be embodied in computer-readable instructions for execution by one or more processors (e.g., processors 230 of FIG. 2) such that the steps of the method 300 may be performed in part or in whole by functional components (e.g., modules) of a client device or the automated key and encryption system 240; accordingly, the method 300 is described below by way of example with reference thereto. However, it shall be appreciated that the method 300 may be deployed on various other hardware configurations and is not intended to be limited to the functional components of the client device or the automated key and encryption system 240.

At operation 305, the automated key and encryption system 240 stores a first key policy in association with a first key, and a second key policy in associated with a second key, for example within a database 250. The first and second keys may for example include public keys that include information about an encryption key, such as the identity of an owner of the key, and a digital signature of an entity that has verified the key's contents.

At operation 310, the encryption module 205 determines a remote machine (e.g., a client device 260) that stores a first application affected by the first key policy, and a second application affected by the second key policy, wherein the first application utilizes the first key to encrypt first data and the second application utilizes the second key to encrypt second data.

In some embodiments, the encryption module 205 may periodically scan remote machines to determine whether or not the keys utilizes by applications of the remote machines are compliant with existing key policies. In further embodiments, the encryption module 205 may periodically transmit requests to one or more remote machines, wherein the requests include an identification of one or more key policies, and cause the remote machine to check keys affecting applications to determine whether the keys are compliant to the key policies identified by the request.

At operation 315, the encryption module 205 determines that the first key of the first application is non-compliant with the first key policy. The first key utilized by the first application may be expired or revoked, or a trigger event may occur that causes the first key to become non-compliant. For example, an administrator of the automated key and encryption system 240 may tag or otherwise identify the first key as non-compliant based on attributes of a key associated with the first key, or of the key itself, or in further embodiments, a trigger event may cause the encryption module 205 to tag the first key as non-compliant.

At operation 320, in response to the encryption module 205 determining that the first key of the first application is non-compliant with the first key policy, the key policy module 210 transmits a request to the first application to deploy and utilize a third key (i.e., an up-to-date, compliant key). In some embodiments, the request may include additional request criteria, such as a time to deploy the third key, or a definition of an event which must occur before the third key can be deployed. For example, the event may include the first application receiving a request for a user to log-in to a user account, or a request to restart or reboot the remote machine.

At operation 325, the communication module 215 receives a response from the first application at the remote machine, wherein the response includes a result of the request to deploy the third key. For example, the result may include an indication that the third key deployed successfully or unsuccessfully.

Figure 4:
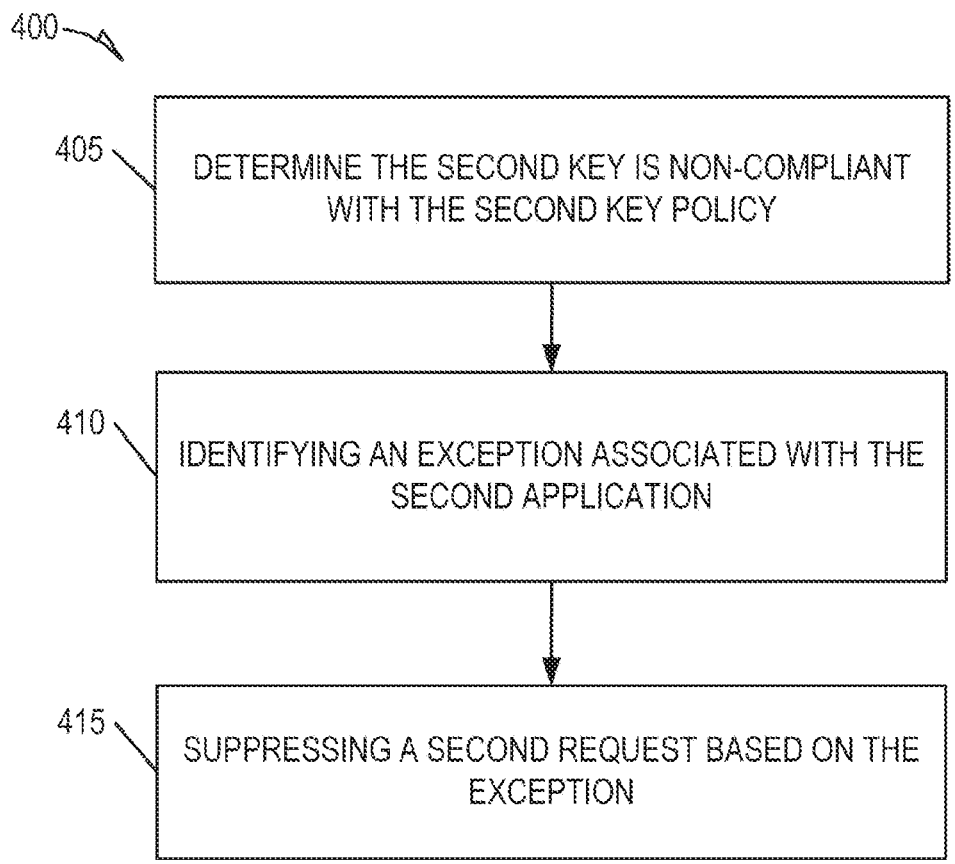
FIG. 4 is a flowchart illustrating a method for suppressing a request to update a key, according to an example embodiment.

FIG. 4 is a flowchart illustrating a method 400 for suppressing a request to update a key, according to an example embodiment. The method 400 may be embodied in computer-readable instructions for execution by one or more processors (e.g., processors 230 of FIG. 2) such that the steps of the method 400 may be performed in part or in whole by functional components (e.g., modules) of a client device 260 or the automated key and encryption system 240; accordingly, the method 400 is described below by way of example with reference thereto. The method 400 may be performed as a subroutine or subsequent to the method 300, wherein the automated key and encryption system 240 updates an out of date key at a remote machine (e.g., a client device 260), according to an example embodiment.

At operation 405, the encryption module 205 determines that the second key of the second application stored at the remote machine is non-compliant with the second key policy. For example, the second key utilized by the second application for the encryption of data may be expired or revoked, or a trigger event may occur that causes the second key to become non-compliant.

At operation 410, in response to the encryption module 205 determining that the second key of the second application stored at the remote machine is non-compliant with the second key policy, the key policy module 210 identifies an exception associated with one or more of the second application, the remote machine, or the second key within the database 250.

At operation 415, in response to identifying the exception associated with one or more of the second application, the remote machine, or the second key within the database 250, the key policy module 210 suppresses a request to update the non-compliant key (i.e., the second key) of the second application at the remote machine.

Figure 5:
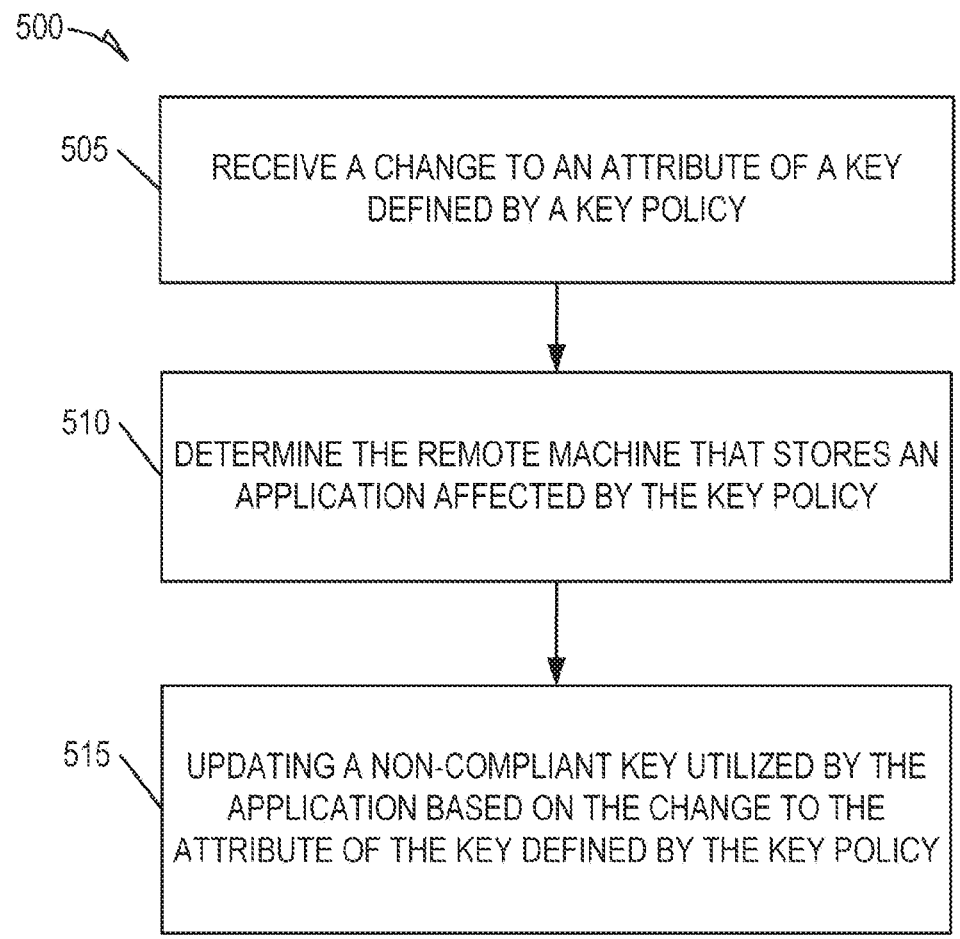
FIG. 5 is a flowchart illustrating a method for updating an out of date key at a remote machine, according to an example embodiment.

FIG. 5 is a flowchart illustrating a method 500 for updating an out of date key at a remote machine, according to an example embodiment. The method 500 may be embodied in computer-readable instructions for execution by one or more processors (e.g., processors 230 of FIG. 2) such that the steps of the method 400 may be performed in part or in whole by functional components (e.g., modules) of a client device 260 or the automated key and encryption system 240, accordingly, the method 500 is described below by way of example with reference thereto. The method 500 may be performed as a subroutine or subsequent to the operations of the method 300, wherein the automated key and encryption system 240 updates an out of date key at a remote machine (e.g., a client device 260), according to an example embodiment.

At operation 505, the key policy module 215 receives a change to an attribute of a key defined by a key policy. For example, an administrator of the automated key and encryption system 240 may provide an input that changes attributes of keys generated by the first key policy and the second key policy. For example, the attributes of the keys may include a key size (e.g., number of bits in a key), a key type (symmetrical or asymmetrical), as well as an algorithm used to generate the keys. An administrator may provide one or more inputs changing or modifying the keys to be generated by the first key policy and the second key policy, based on a selection of attributes of the keys.

At operation 510, the key policy module 215 determines a remote machine that stores an application affected by the key policy that received the change to the attribute of the key. For example, as in operation 310 of the method 300, the key policy module 215 may determine that a client device 260 stores a first application, wherein the first application is affected by a modification to the first key policy, wherein the modification changed attributes of keys generated by the first key policy. For example, the administrator may specify that keys generated by the first key policy must be of a specified key size, or key type.

At operation 515, in response to determining the remote machine that stores the application affected by the key policy that received the change, the encryption module 205 updates any non-compliant keys utilized by the application, based on the changes to the attributes of keys generated by the key policy. For example, the encryption module 205 may determine that a first key utilized by the first application is non-compliant as a result of the change to the first key policy, and in response, the encryption module 205 de-crypts the first key, and re-encrypts the first key based on the changes to the first key policy.

Figure 6:
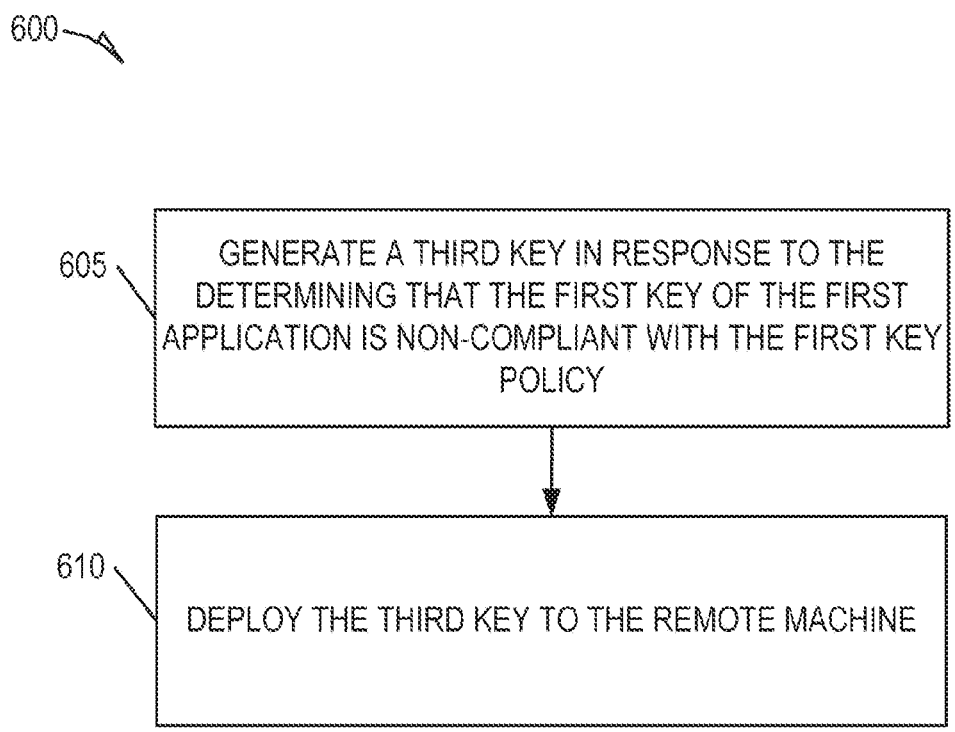
FIG. 6 is a flowchart illustrating a method for deploying a key at a remote machine, according to an example embodiment.

FIG. 6 is a flowchart illustrating a method 600 for deploying a key at a remote machine, according to an example embodiment. The method 600 may be embodied in computer-readable instructions for execution by one or more processors (e.g., processors 230 of FIG. 2) such that the steps of the method 400 may be performed in part or in whole by functional components (e.g., modules) of a client device 260 or the automated key and encryption system 240; accordingly, the method 600 is described below by way of example with reference thereto. The method 600 may be performed as a subroutine or subsequent to the operations 315 and 320 of the method 300, wherein the key policy module 215 determines the first key of the first application is non-compliant with the first key policy, according to an example embodiment.

At operation 605, in response to determining that the first key of the first application at the remote machine is non-compliant with the first key policy, the key policy module 210 generates a third key, wherein the third key complies with the first key policy of the first application. In some embodiments, the key policy module 210 may cause the first application stored at the remote machine to generate the third key based on the first key policy.

At operation 610, the key policy module 210 deploys the third key at the remote machine. In response to receiving the third key at the remote machine, the key policy module 210 first identifies any data encrypted using the first key, decrypts the data using the first key, and re-encrypts the data using the third key. In response to re-encrypting the data using the third key, the key policy module 210 deletes the first key. The key may be deployed to the remote machine as a certificate, through various protocols that include PGP, SSH, SCP, IPsec, as well as HTTP.

Figure 7:
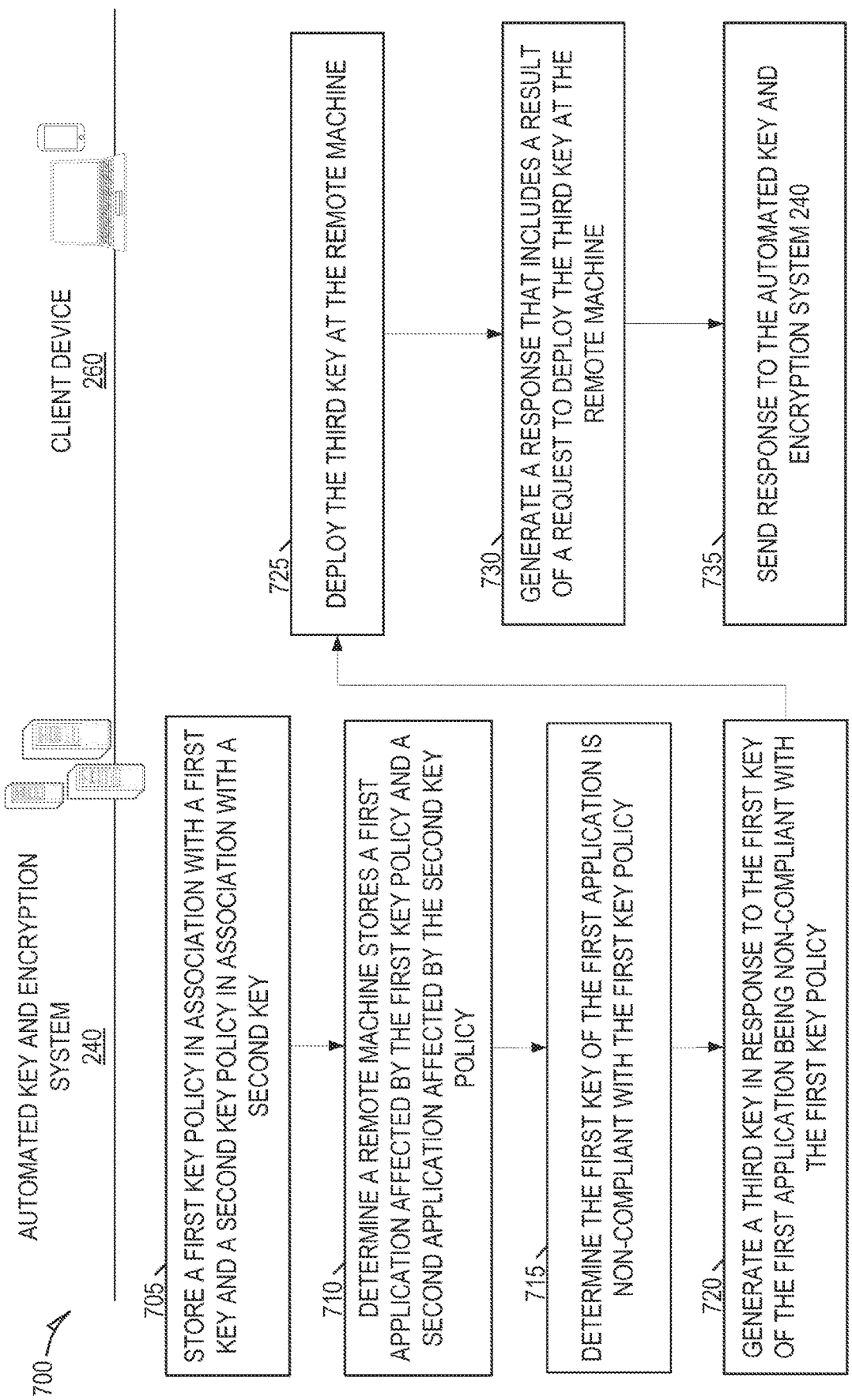
FIG. 7 is an interaction diagram illustrating interactions between various devices and the automated key and encryption system, according to an example embodiment.

FIG. 7 is an interaction diagram illustrating interactions between a remote machine (e.g., the client device 260) and the automated key and encryption system 240, according to an example embodiment.

At operation 705, the automated key and encryption system 240 stores a first key policy in association with a first key, and a second key policy in associated with a second key. In some embodiments, the automated key and encryption system may store the key policies and keys within a database 250. In further embodiments, the automated key and encryption system 240 may additionally store references to remote machines that store applications that utilize the first key and the second key to encrypt data.

At operation 710, the automated key and encryption system 240 determines a remote machine (e.g., a client device 260) that stores a first application affected by the first key policy, and a second application affected by the second key policy, wherein the first application utilizes the first key to encrypt first data and the second application utilizes the second key to encrypt second data.

At operation 715, in response to determining that the remote machine stores the first application affected by the first key policy and the second application affected by the second key policy, the automated key and encryption system 240 determines that the first key of the first application is non-compliant with the first key policy stored at the automated key and encryption system 240.

At operation 720, in response to determining that the first key of the first application is non-compliant with the first key policy, the automated key and encryption system generates a third key to be deployed to the remote machine.

At operation 725, the remote machine receives the third key from the automated key and encryption system 240, and deploys the third key to the first application. Deploying the third key may cause the remote machine to delete the non-compliant key (i.e., the first key).

At operation 730, the remote machine generates a response to be sent to the automated key and encryption system 240, wherein the response includes information and results pertaining to the deployment of the third key at the remote machine. For example, the response may include information that describes why and how the first key became non-compliant, as well as an indication of the success or failure of the deployment of the third key.

At operation 735, the remote machine transmits the response to the automated key and encryption system 240. In some embodiments, the response may additionally include an identification of the remote machine.

Figure 8:
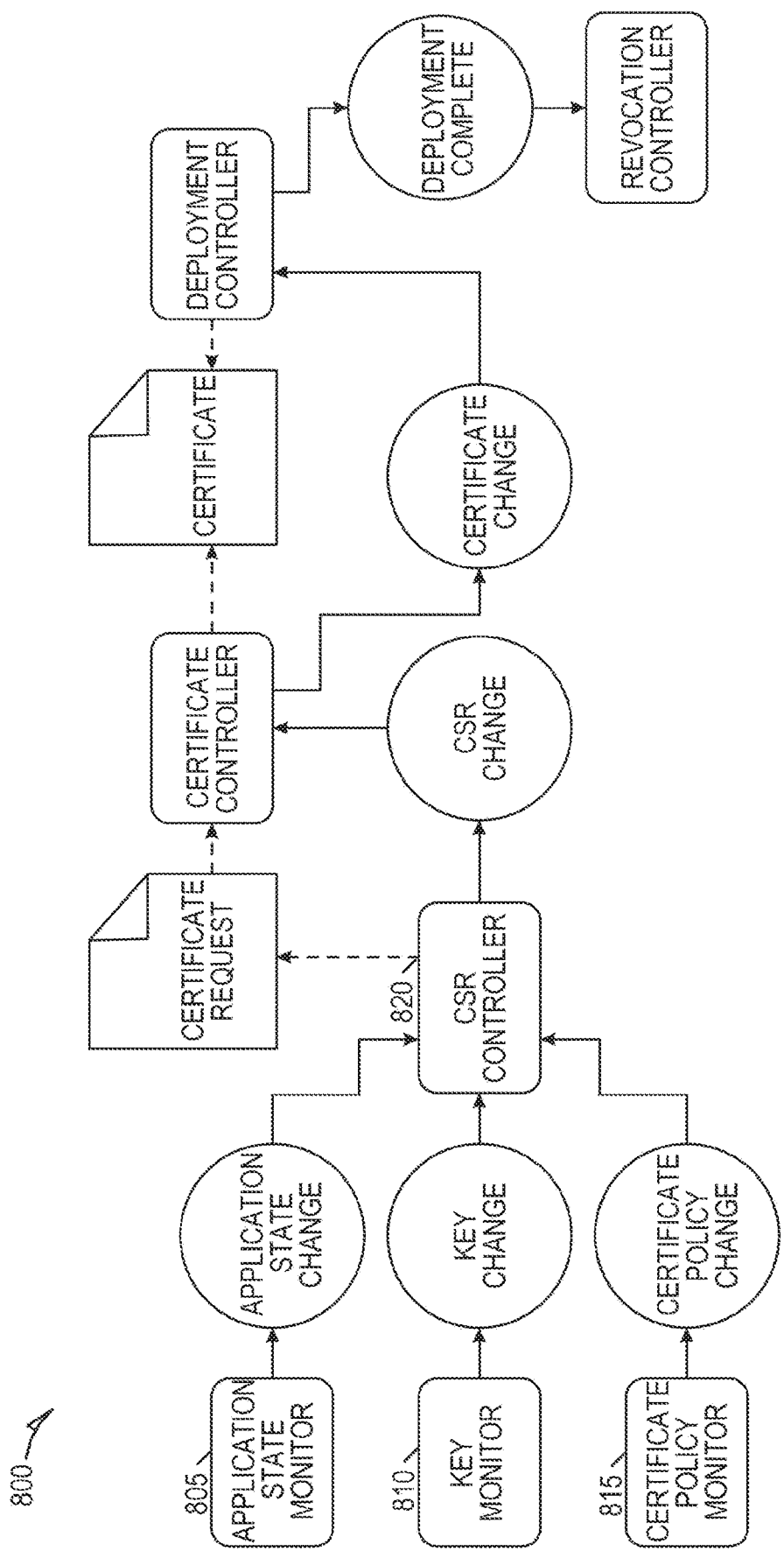
FIG. 8 is a flow diagram illustrating a method for generating a certificate, according to an example embodiment.

FIG. 8 is a flow diagram illustrating a method 800 for generating a key, according to an example embodiment. As seen in the method 800, various monitors, including an application state monitor 805, a key monitor 810, and a key policy monitor 815, detect various trigger events that may include changes in application states, changes to keys, and changes to key policies, and in response to detecting the trigger events, cause a Certificate Signing Request (CSR) controller 820 to request a certificate to be generated based on a new key, and deploy the certificate that includes the new key to a deployment controller 825 that deploys the certificate and new key to the remote machine to update an out of date key.

In some example embodiments, and as discussed in the method 300 of FIG. 3, a certificate policy monitor 815 may periodically scan remote machines to determine whether or not the keys utilizes by applications of the remote machines are compliant with existing key policies. In response to the certificate policy monitor 815 determining that a key of an application stored at a remote machine is non-compliant with a current key policy, the certificate policy monitor 815 transmits a notification to the CSR controller 820 that causes the CSR controller 820 to request a certificate to be generated using a new, up-to-date key, and deploy the certificate to a deployment controller 825 that deploys the key from the certificate to the remote machine to update an out of date key.

In some example embodiments, and as discussed in the method 500 of FIG. 5, a key monitor 810 may detect a change to an attribute of a key defined by a key policy, and in response, transmit a notification to the CSR controller 820 that causes the CSR controller 820 to generate a certificate that includes an updated key to be sent to a deployment controller 825 that deploys the certificate to the remote machine to update an out of date key.

In some example embodiments, the application state monitor 805 may detect an application state change, and in response, transmit a notification to the CSR controller 820 that causes the CSR controller 820 to request a certificate that includes an updated key to be generated based on a key policy, and deploy the certificate to a deployment controller 825 that deploys the certificate to the remote machine to update an out of date key. An application state change may for example include a new host, new IP address, or new URL.

Figure 9:
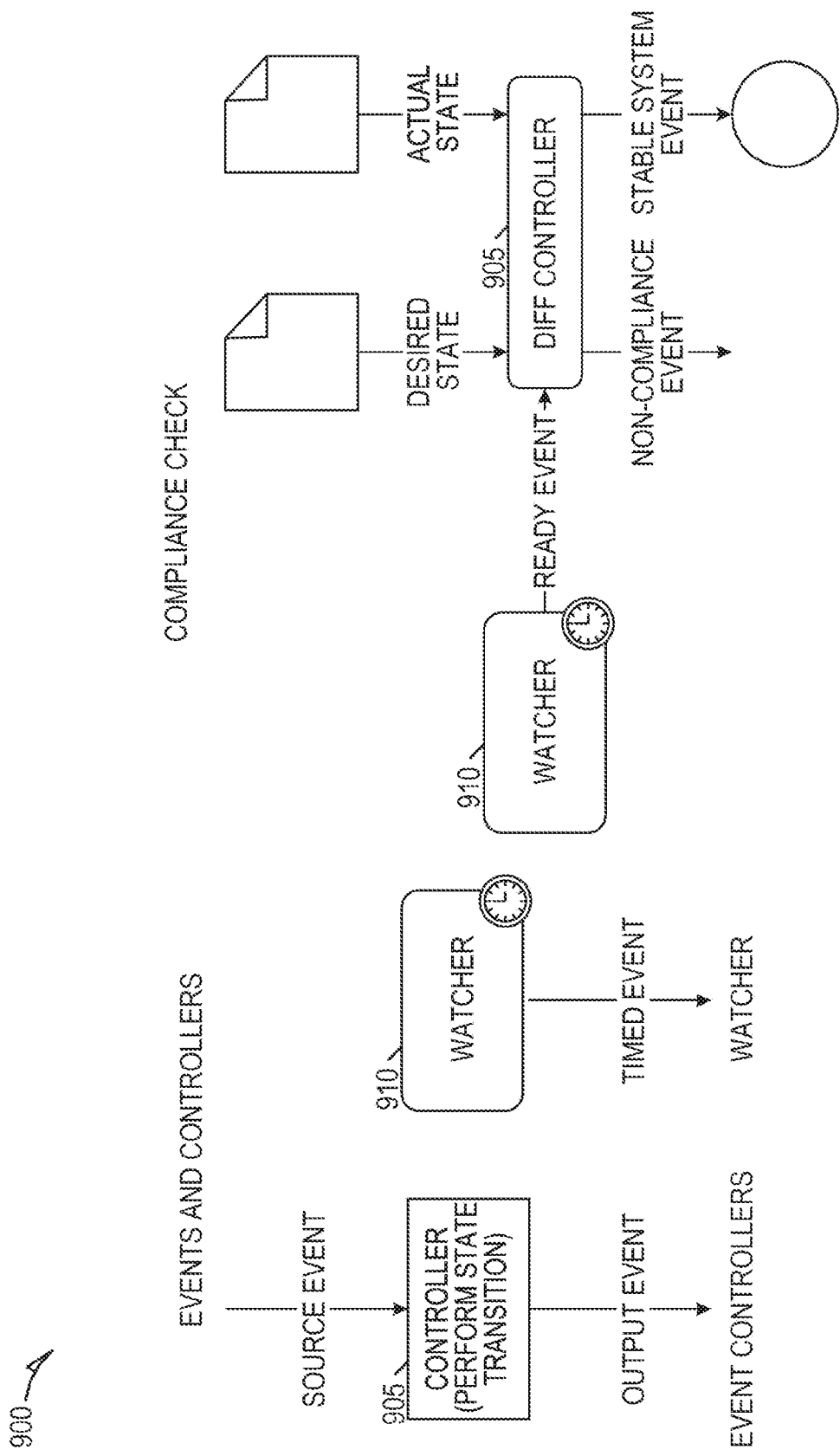
FIG. 9 includes a depiction of flow diagrams for providing notification and messaging, according to certain example embodiments.

FIG. 9 includes a depiction of flow diagrams 900 for providing notification and messaging, according to certain example embodiments. As seen in FIG. 9, a controller 905 (also referred to as a diff controller 905) is configured to perform a state transition (i.e., update a non-compliant key), and to generate and present an output event that may include a notification that includes an indication that the state transition was performed successfully or unsuccessfully.

In some example embodiments, the watcher 910 is configured to cause the diff controller 905 to perform a compliance check in response to detecting an expiration of a timer. In response to detecting the expiration of the timer, the watcher 910 notifies the diff controller 905 of the expiration of the timer, and the diff controller 905 determines a remote machine is storing an application affected by a non-compliant key policy.

Figure 10:
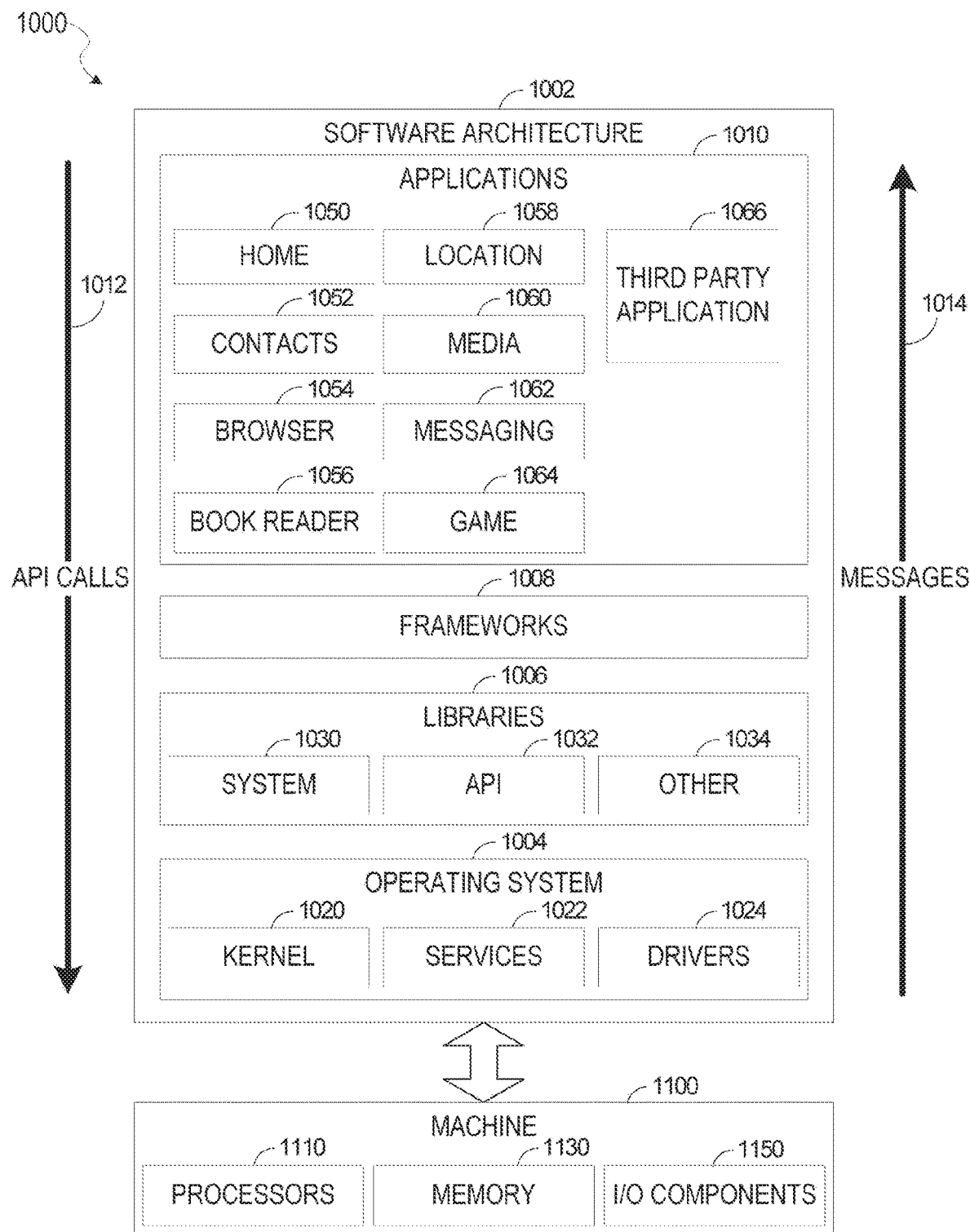
FIG. 10 is a block diagram illustrating an architecture of software, which can be installed on any one or more of the devices described herein, according to an example embodiment.

FIG. 10 is a block diagram 1000 illustrating an architecture of software 1002, which can be installed on any one or more of the devices described above. FIG. 10 is merely a non-limiting example of a software architecture, and it will be appreciated that many other architectures can be implemented to facilitate the functionality described herein. In various embodiments, the software 1002 is implemented by hardware such as a machine 1100 of FIG. 11 that includes processors 1110, memory 1130, and I/O components 1150. In this example architecture, the software 1002 can be conceptualized as a stack of layers where each layer may provide a particular functionality. For example, the software 1002 includes layers such as an operating system 1004, libraries 1006, frameworks 1008, and applications 1010. Operationally, the applications 1010 invoke application programming interface (API) calls 1012 through the software stack and receive messages 1014 in response to the API calls 1012, consistent with some embodiments.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers, consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010, according to some embodiments. For example, the frameworks 1008 provide various graphic user interface (GUI) functions, high-level resource management, high-level location services, and so forth. The frameworks 1008 can provide a broad spectrum of other APIs that can be utilized by the applications 1010, some of which may be specific to a particular operating system or platform.

In an example embodiment, the applications 1010 include a home application 1050, a contacts application 1052, a browser application 1054, a book reader application 1056, a location application 1058, a media application 1060, a messaging application 1062, a game application 1064, and a broad assortment of other applications such as a third-party application 1066. According to some embodiments, the applications 1010 are programs that execute functions defined in the programs. Various programming languages can be employed to create one or more of the applications 1010, structured in a variety of manners, such as object-oriented programming languages (e.g., Objective-C, Java, or C++) or procedural programming languages (e.g., C or assembly language). In a specific example, the third-party application 1066 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1066 can invoke the API calls 1012 provided by the operating system 1004 to facilitate functionality described herein.

Figure 11:
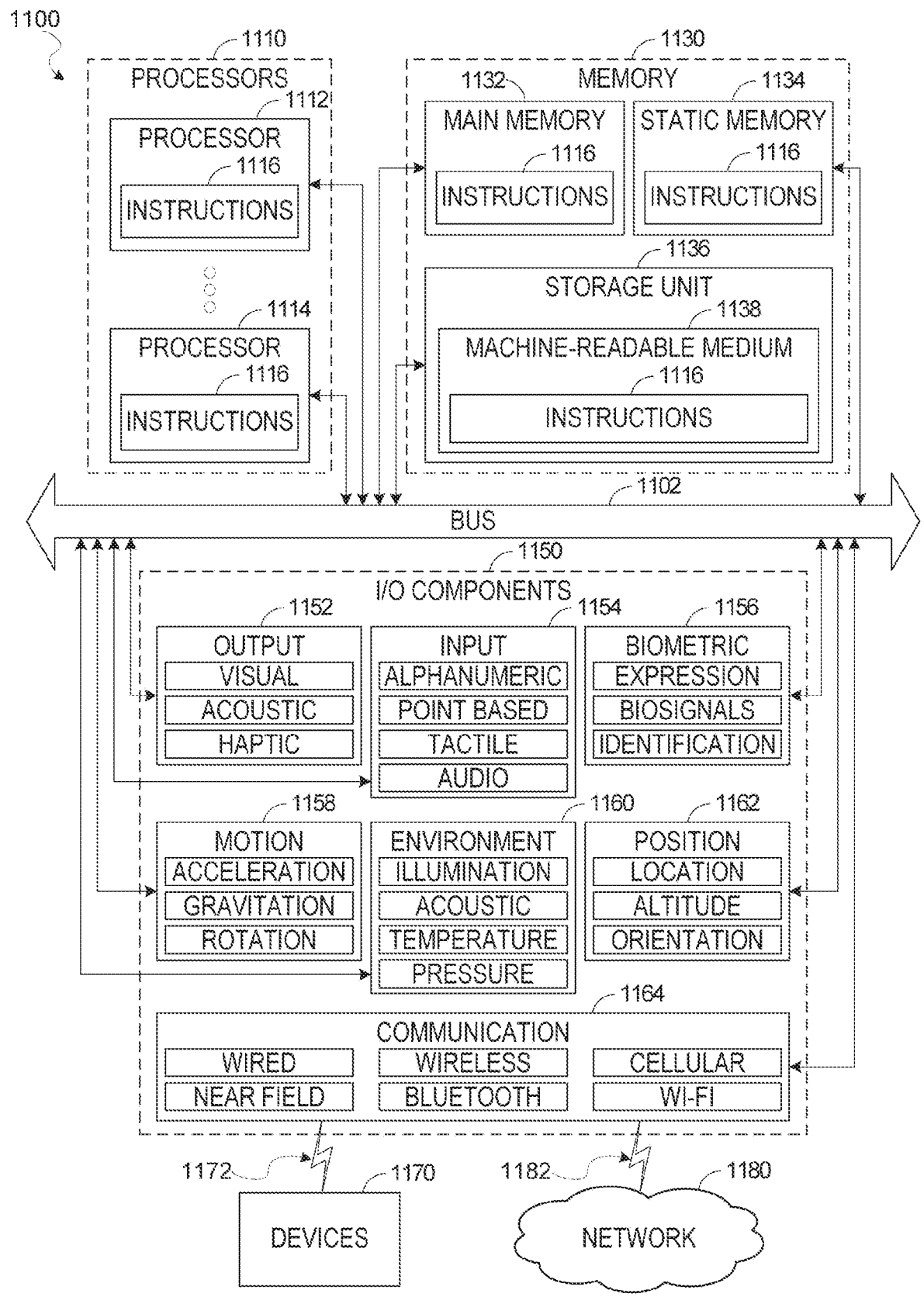
FIG. 11 illustrates a diagrammatic representation of a machine in the form of a computer system within which a set of instructions may be executed for causing the machine to perform any one or more of the methodologies discussed herein, according to an example embodiment.

FIG. 11 illustrates a diagrammatic representation of a machine 1100 in the form of a computer system within which a set of instructions may be executed for causing the machine to perform any one or more of the methodologies discussed herein, according to an example embodiment. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example the instructions 1116 may cause the machine 1100 to execute the method 1100 of FIG. 11. Additionally, or alternatively, the instructions 1116 may implement FIGS. 3-7, and so forth. The instructions 1116 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory 1130, and IO components 1150, which may be configured to communicate with each other such as via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFC), another processor, or any suitable combination thereof) may include, for example, a processor 1112 and a processor 1114 that may execute the instructions 1116. The term "processor" is intended to include multi-core processors that may comprise two or more independent processors (sometimes referred to as "cores") that may execute instructions contemporaneously. Although FIG. 11 shows multiple processors, the machine 1100 may include a single processor with a single core, a single processor with multiple cores (e.g., a multi-core processor), multiple processors with a single core, multiple processors with multiples cores, or any combination thereof.

The memory 1130 may include a main memory 1132, a static memory 1134, and a storage unit 1136, both accessible to the processors 1110 such as via the bus 1102. The main memory 1130, the static memory 1134, and storage unit 1136 store the instructions 1116 embodying any one or more of the methodologies or functions described herein. The instructions 1116 may also reside, completely or partially, within the main memory 1132, within the static memory 1134, within the storage unit 1136, within at least one of the processors 1110 (e.g., within the processor's cache memory), or any suitable combination thereof, during execution thereof by the machine 1100.

The I/O components 1150 may include a wide variety of components to receive input, provide output, produce output, transmit information, exchange information, capture measurements, and so on. The specific I/O components 1150 that are included in a particular machine will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162, among a wide array of other components.

For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1162 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or another suitable device to interface with the network 1180. In further examples, the communication components 1164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a USB).

Moreover, the communication components 1164 may detect identifiers or include components operable to detect identifiers. For example, the communication components 1164 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1164, such as location via Internet Protocol (IP) geolocation, location via Wi-Fi® signal triangulation, location via detecting an NFC beacon signal that may indicate a particular location, and so forth.

The various memories (i.e., 1130, 1132, 1134, and/or memory of the processor(s) 1110) and/or storage unit 1136 may store one or more sets of instructions and data structures (e.g., software) embodying or utilized by any one or more of the methodologies or functions described herein. These instructions, when executed by processor(s) 1110 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically exclude carrier waves, modulated data signals, and other such media, at least some of which are covered under the term "signal medium" discussed below.

In various example embodiments, one or more portions of the network 1180 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., hypertext transfer protocol (HTTP)). Similarly, the instructions 1116 may be transmitted or received using a transmission medium via the coupling 1172 (e.g., a peer-to-peer coupling) to the devices 1170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   storing, by an encryption system, a first key policy in association with a first key and a second key policy in association with a second key;
   determining a remote machine stores a first application affected by the first key policy and a second application affected by the second key policy, the first application utilizing the first key to encrypt first data, and the second application utilizing the second key to encrypt second data;
   determining the first key of the first application is non-compliant with the first key policy;
   in response to the determining that the first key of the first application is non-compliant with the first key policy, sending a request to deploy a third key;
   determining that the second key of the second application is non-compliant with the second key policy;
   identifying an exception corresponding to the second key policy associated with an owner identifier of the second key and digital signature for verified contents of the second key;
   in response to the second application being non-compliant, suppressing a second request to update the second key based on the exception associated with the owner identifier and the digital signature;
   receiving a first response at the encryption system, the first response including a result of the request to deploy the third key and a suppression of the second request.

2. The method of claim 1, further comprising:
   receiving a change to an attribute of a key defined by the first key policy;
   determining the remote machine that stores the first application affected by the first key policy, in response to the change to the attribute of the key defined by the first key policy; and
   updating the first key utilized by the first application based on the change to the attribute of the key defined by the first key policy.

3. The method of claim 2, wherein the attribute of the key is any one of key length, symmetry or asymmetry of the key, or an algorithm to generate the key.

4. The method of claim 1, wherein the method further comprises:
   in response to the determining that the first key of the first application is non-compliant with the first key policy:
   generating the third key at the encryption system; and
   deploying the third key to the remote machine.

5. The method of claim 4, wherein the first response further comprises failure information associated with the deploying of the third key to the remote machine.

6. The method of claim 1, wherein the determining the first key of the first application is non-compliant with the first key policy includes:
   detecting an expiration event associated with the first key.

7. The method of claim 6, wherein the expiration event includes an expiration of a temporal period associated with the first key.

8. A system comprising:
   one or more processors; and
   a non-transitory memory storing instructions that configure the one or more processors to perform operations comprising:
   storing, by an encryption system, a first key policy in association with a first key and a second key policy in association with a second key;
   identifying first data stored on a remote machine encrypted by the first key;
   identifying second data stored on the remote machine encrypted by the second key, the first key different than the second key;
   determining the first key is not compliant with the first key policy;
   in response to determining the first key is not compliant with the first key policy, sending a request to deploy a third key;
   determining that the second key is non-compliant with the second key policy;
   identifying an exception corresponding to the second key policy associated with an owner identifier of the second key and digital signature for verified contents of the second key;
   in response to the second key being non-compliant and the exception corresponding to the second key policy associated with the owner identifier of the second key and the digital signature, suppressing a second request to update the second key utilized by the second application based on attributes of the second key policy; and receiving a first response at the encryption system, the first response including a result of the request to deploy the third key and a result of the suppression of the second request.

9. The system of claim 8, wherein the operations further comprise:
receiving a change to an attribute of a key defined by the first key policy;
determining the remote machine that stores a first application affected by the first key policy, in response to the change to the attribute of the key defined by the first key policy; and
updating the first key utilized by the first application based on the change to the attribute of the key defined by the first key policy.

10. The system of claim 9, wherein the attribute of the key is any one of key length, symmetry or asymmetry of the key, or an algorithm to generate the key.

11. The system of claim 8, wherein the first response includes an event to occur prior to deploying the third key, and wherein the operations further comprise:
in response to the determining that the first key of the first data is non-compliant with the first key policy:
generating the third key at the encryption system; and
deploying the third key to the remote machine based on the event occurring.

12. The system of claim 11, wherein the event includes a reboot of the remote machine, and wherein the first response further comprises failure information associated with the deploying of the third key to the remote machine.

13. The system of claim 8, wherein the determining the first key of the first data is non-compliant with the first key policy includes:
detecting an expiration event associated with the first key; and
detecting a change in an encryption standard associated with the first key policy.

14. The system of claim 13, wherein the first response includes a description of why the first key is non-compliant, and wherein the expiration event includes an expiration of a temporal period associated with the first key.

15. A non-transitory machine-readable storage medium including instructions that, when executed by a machine, cause the machine to perform operations comprising:
storing, by an encryption system, a first key policy in association with a first key and a second key policy in association with a second key;
determining a remote machine stores a first application affected by the first key policy and a second application affected by the second key policy, the first application utilizing the first key to encrypt first data, and the second application utilizing the second key to encrypt second data;
determining the first key of the first application is non-compliant with the first key policy;

in response to the determining that the first key of the first application is non-compliant with the first key policy, sending a request to deploy a third key;
determining that the second key is non-compliant with the second key policy;
identifying an exception corresponding to the second key policy associated with an owner identifier of the second key and digital signature for verified contents of the second key;
in response to the second application being non-compliant and based on the exception corresponding to the second key policy associated with an owner identifier of the second key and digital signature, suppressing a second request to update the second key utilized by the second application based on attributes of the second key policy; and
receiving a first response at the encryption system, the first response including a result of the request to deploy the third key and a result of the suppressed second request.

16. The non-transitory machine-readable storage medium of claim 15, wherein the operations further comprise:
receiving a change to an attribute of a key defined by the first key policy;
determining the remote machine that stores the first application affected by the first key policy, in response to the change to the attribute of the key defined by the first key policy; and
updating the first key utilized by the first application based on the change to the attribute of the key defined by the first key policy.

17. The non-transitory machine-readable storage medium of claim 16, wherein the attribute of the key is any one of: key length, symmetry or asymmetry of the key, or an algorithm to generate the key.

18. The non-transitory machine-readable storage medium of claim 15, wherein the first response includes an event to occur prior to deploying the third key, the event including receiving log-in information at the remote machine, and wherein the operations further comprise:
in response to the determining that the first key of the first application is non-compliant with the first key policy:
generating the third key at the encryption system; and
deploying the third key to the remote machine based on the event occurring.

19. The non-transitory machine-readable storage medium of claim 16, wherein determining that the first key of the first application is non-compliant with the first key policy includes receiving an input that includes a change or an update to the first key, and wherein the operations further comprise:
identifying and flagging the first application and a third application affected by the first key policy; and
updating the first key policy.

20. The non-transitory machine-readable storage medium of claim 15, wherein the request further comprises a time to deploy the third key and a definition for an event at which to deploy the third key.

* * * * *